United States Patent
Smith et al.

(10) Patent No.: US 10,163,599 B1
(45) Date of Patent: Dec. 25, 2018

(54) ELECTRON MULTIPLIER FOR MEMS LIGHT DETECTION DEVICE

(71) Applicant: Eagle Technology, LLC, Melbourne, FL (US)

(72) Inventors: Arlynn W. Smith, Blue Ridge, VA (US); Dan Chilcott, Buchanan, VA (US)

(73) Assignee: Eagle Technology, LLC, Melbourne, FL (US)

( * ) Notice: Subject to any disclaimer, the term of this patent is extended or adjusted under 35 U.S.C. 154(b) by 0 days.

(21) Appl. No.: 15/861,379

(22) Filed: Jan. 3, 2018

(51) Int. Cl.
  *H01J 29/02* (2006.01)
  *G01T 1/24* (2006.01)
  *H01J 9/12* (2006.01)
  *H01J 31/50* (2006.01)

(52) U.S. Cl.
  CPC .......... *H01J 29/023* (2013.01); *G01T 1/241* (2013.01); *H01J 9/125* (2013.01); *H01J 31/506* (2013.01)

(58) Field of Classification Search
  CPC ........ H01J 29/023; H01J 31/506; H01J 9/125; H01J 43/04; H01J 3/023; G01T 1/241
  See application file for complete search history.

(56) References Cited

U.S. PATENT DOCUMENTS

| | | | |
|---|---|---|---|
| 5,127,080 A | 6/1992 | Duggan, Sr. | |
| 5,360,630 A | 11/1994 | Thomas et al. | |
| 5,504,386 A * | 4/1996 | Kyushima | H01J 43/28 313/103 CM |
| 6,005,239 A | 12/1999 | Suzuki et al. | |
| 6,836,059 B2 | 12/2004 | Smith | |
| 7,023,126 B2 | 4/2006 | Smith | |
| 7,042,060 B2 | 5/2006 | Costello et al. | |
| 8,698,925 B2 | 4/2014 | Costello et al. | |
| 8,933,419 B2 | 1/2015 | Nuetzel et al. | |
| 9,105,459 B1 * | 8/2015 | Floryan | H01J 43/243 |
| 9,177,764 B1 * | 11/2015 | Baney | H01J 9/14 |
| 2003/0210332 A1 * | 11/2003 | Frame | H04N 5/332 348/216.1 |
| 2005/0087676 A1 * | 4/2005 | Shimoi | H01J 43/04 250/214 VT |
| 2005/0122021 A1 * | 6/2005 | Smith | H01J 29/085 313/103 CM |
| 2007/0194713 A1 * | 8/2007 | Kyushima | H01J 43/24 313/532 |
| 2013/0146778 A1 * | 6/2013 | Nuetzel | H01J 1/32 250/370.14 |
| 2015/0076320 A1 * | 3/2015 | Fushie | G01T 1/185 250/207 |
| 2015/0115992 A1 * | 4/2015 | Fushie | H01J 43/246 324/759.01 |

* cited by examiner

Primary Examiner — Joseph L Williams
Assistant Examiner — Jose M Diaz
(74) *Attorney, Agent, or Firm* — Edell, Shapiro & Finnan, LLC

(57) ABSTRACT

An electron multiplier for a Micro-Electro-Mechanical-Systems (MEMS) image intensifier includes an input surface, an emission surface, a plurality of doped ribs, and a plurality of textured surfaces. The input surface receives electrons and the emission surface is opposite the input surface. The plurality of doped ribs extends at least partially between the input surface and the emission surface to form a plurality of pixels. The plurality of textured surfaces are disposed in the plurality of pixels.

20 Claims, 5 Drawing Sheets

ELECTRON MULTIPLIER FOR MEMS LIGHT DETECTION DEVICE

BACKGROUND

Image intensifiers typically include a photocathode layer or component and an electron multiplier of some type. Generally, the photocathode layer or component converts incoming photons into electrons and the electron multiplier (e.g., a photoelectric component or layer, commonly referred to as a gain layer) generates multiple electrons from electrons received from the photocathode layer or component. Often, the electron multiplier (i.e., a gain layer) utilizes electron impact ionization as a gain mechanism to amplify the electrical response generated by the photocathode layer or component (the electrical response generated in response to incoming photons).

Unfortunately, imagers that rely on electron impact ionization as a gain mechanism often experience performance degradation when electrons move along undesirable paths prior to or subsequent to an impact. For example, if electrons backscatter (reflect or bounce) off an input surface of the electron multiplier, these backscattered electrons may create a halo effect that degrades image quality. Additionally or alternatively, some electrons, including backscattered electrons, may be lost between the photocathode layer or component and the electron multiplier (i.e., if the electrons are absorbed by a structure other than the electron multiplier). Still further, electrons may move laterally within the electron multiplier, thereby degrading the spatial fidelity of the electrons output by the electron multiplier. That is, crosstalk between pixels, or adjacent regions, in the photoelectric component or layer may cause performance degradation.

Over time, various solutions have attempted to address at least some of these issues; however, the solutions often fail to address all three of the aforementioned issues. Moreover, the solutions may be inefficient to implement, in terms of time, resources, and cost, especially for a Micro-Electro-Mechanical-Systems (MEMS) image intensifier. For example, some electron multipliers include a collimator grid that reduces halo effect, but the collimator grid may fail to limit crosstalk between pixels of the electron multiplier and increase the amount of electrons lost between the photocathode layer and the electron multiplier. Moreover, adding a collimator grid to a substrate may be expensive and inefficient. Alternatively, some electron multipliers include textured regions while other electron multipliers include doped regions. These doped or textured regions might reduce crosstalk or halo effect, respectively, but neither of these regions addresses both issues (e.g., textured regions might reduce halo effect but do not reduce crosstalk while doped regions might reduce crosstalk without impacting halo effect). In view of the aforementioned issues, an electron multiplier that reduces the halo effect caused by backscattered electrons and reduces crosstalk between pixels, while also limiting the number of electrons lost between the photocathode layer or component and the electron multiplier is desired. In particular, an electron multiplier that provides these advantages for MEMS image intensifiers is desired.

SUMMARY

According to one embodiment, an electron multiplier for a Micro-Electro-Mechanical-Systems (MEMS) image intensifier includes an input surface, an emission surface, a plurality of doped ribs, and a plurality of textured surfaces. The input surface receives electrons and the emission surface is opposite the input surface. The plurality of doped ribs extends at least partially between the input surface and the emission surface to form a plurality of pixels. The plurality of textured surfaces are disposed in the plurality of pixels.

According to another embodiment, a method of forming an electron multiplier for a MEMS image intensifier includes creating a plurality of pixels and creating a plurality of textured surfaces. The plurality of pixels are created between a plurality of ribs that extend at least partially between an input surface and an emission surface of a substrate. The plurality of textured surfaces are created in the plurality of pixels.

According to yet another embodiment, an electron sensing device includes a cathode and an anode with a plurality of textured surfaces. The cathode provides a source of electrons and the anode receives the electrons emitted from the cathode. The plurality of textured surfaces is disposed between doped ribs. The doped ribs extend at least partially through the anode and define a plurality of pixels.

BRIEF DESCRIPTION OF THE DRAWINGS

Like reference numerals have been used to identify like elements throughout this disclosure.

DETAILED DESCRIPTION

An electron multiplier for a Micro-Electro-Mechanical-Systems (MEMS) image intensifier is presented herein. The electron multiplier includes ribs and textured surfaces formed between the ribs. More specifically, the electron multiplier presented herein includes p-type doped ribs that define a plurality of cells or pixels, insofar as the term "doped" or variants thereof (e.g., doping) indicates that a dopant has been added to shift the Fermi levels within the material (with p-type indicating that the ribs have been shifted to predominantly positive charge carriers). Advantageously, since the ribs are made of a p-type dopant (referred to herein simply as dopant, doping, etc.), the ribs prevent electron crosstalk between pixels. The ribs also extend above an input surface of the electron multiplier (i.e., an input surface of the gain layer) and, thus, minimize the halo effect created by backscattered electrons. Meanwhile, textured surfaces that form depressions within the plurality of pixels further assist in preventing backscattered or lost electrons.

Typically ribs that extend above the input surface cause at least some electrons to be lost between the cathode layer and the electron multiplier (e.g., electrons impacting a top surface of a rib may be lost); however, with the electron multiplier presented herein, the textured surfaces formed between the doped ribs limit electron loss. As explained in further detail below, in at least some embodiments, the depressions are inverted pyramids formed by wet etching a substrate that includes the doped ribs. The doped ribs act as a mask when the textured surfaces are etched into the gain layer substrate. Consequently, the textured surfaces may be said to be self-aligned. By comparison, if textured or doped regions are added to a gain layer without ribs, the texturing or dopant must be meticulously applied to achieve a specific configuration.

As mentioned, the electron multiplier presented herein is suitable for MEMS image intensifiers. As a brief example, the electron multiplier presented herein may be formed on multiple die on a wafer (e.g., 50-500 die) for an image intensifier of night vision goggles. This electron multiplier may provide performance advantages that allow a system including the electron multiplier to be substantially smaller and lighter than systems including conventional electron multipliers and, thus, may allow an image intensifier and/or a pair of night vision googles to be substantially smaller, in size and weight, than those incorporating conventional electron multipliers.

Figure 1:
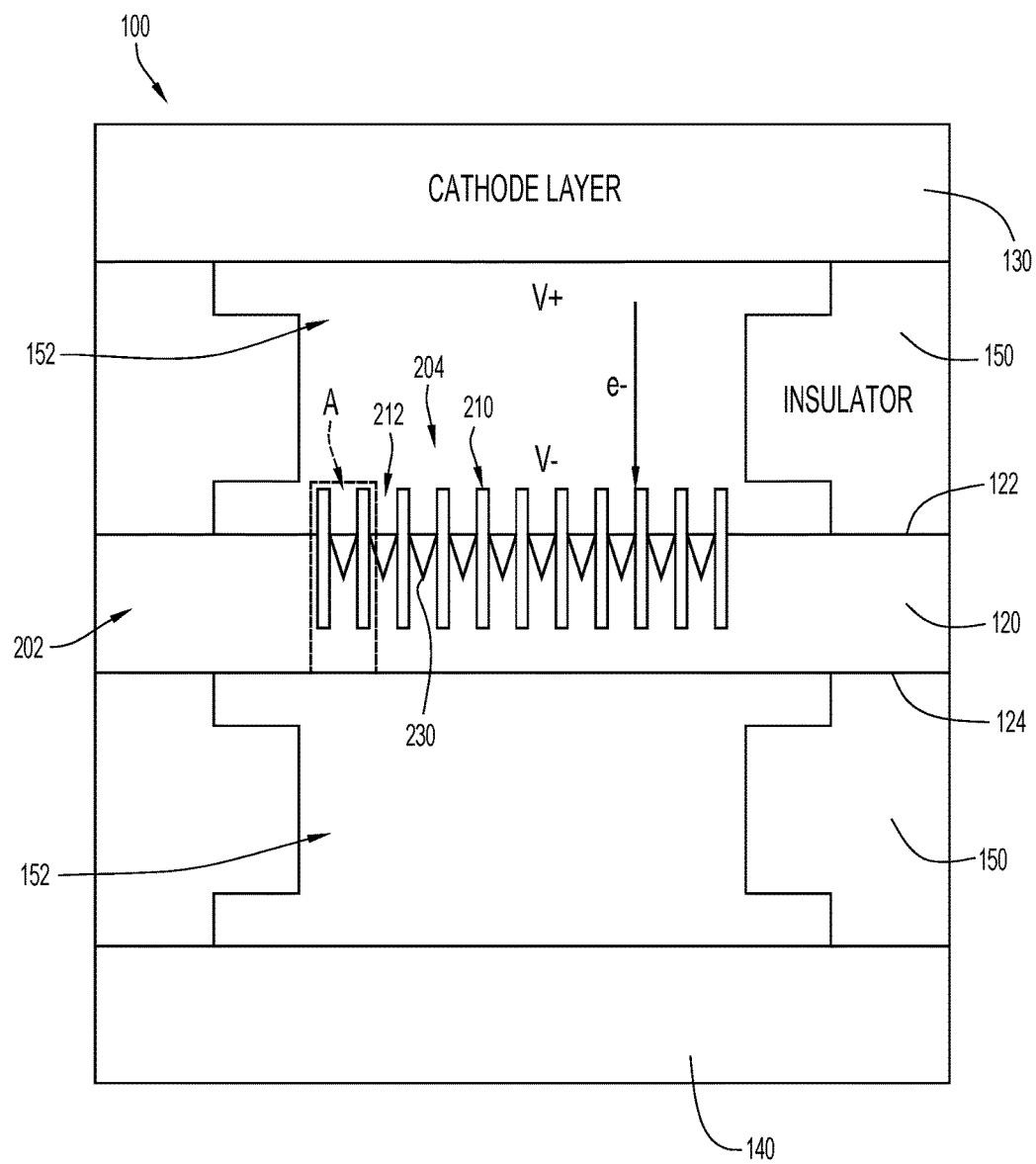
FIG. 1 illustrates a cross-sectional view of a Micro-Electro-Mechanical-Systems (MEMS) image intensifier including an electron multiplier configured in accordance with an example embodiment of the present invention.

Now turning to FIG. 1, this figure illustrates a cross-sectional view of a MEMS image intensifier 100 including an electron multiplier 120 configured in accordance with an example embodiment of the present invention. The MEMS image intensifier 100 also includes a cathode layer 130 and a phosphor screen 140, each of which is coupled to the electron multiplier 120 via an annular insulator 150 that surrounds a vacuum gap 152. In particular, the electron multiplier 120, which may also be referred to as an anode 120 or gain layer 120, includes an input surface 122 and an emission surface 124 that is opposite the input surface 122. The cathode layer 130 sits above the input surface 122 so that the cathode layer 130 may emit electrons towards the input surface 122 (the cathode 130 and anode 120 may be collectively referred to as an electron sensing device). Meanwhile, the phosphor screen 140 sits below the emission surface 124 so that the phosphor screen 140 may receive electrons emitted from the emission surface 124.

More specifically, the cathode layer 130 may convert photons received from ambient light to electrons (e-) and release these electrons towards the electron multiplier 120. An electric field (not shown) between the cathode layer 130 and the electron multiplier 120 may accelerate the electrons towards the electron multiplier 120, causing the electrons to impact the electron multiplier 120. The electron multiplier 120 amplifies the received electrons and emits additional electrons towards the phosphor screen 140. That is, there is a gain of electrons through the electron multiplier 120. However, image intensifier 100 is merely an example and, in other embodiment, the electron multiplier 120 can be included in any MEMS image intensifiers or light detection device now known or developed hereafter.

The particular characteristics of the electron multiplier 120 presented herein provide a highly efficient gain which, in turn, allows the image intensifier 100 (more specifically, the phosphor screen 140) to output visible light that can be viewed in a direct view system (i.e., a system where a user looks directly at phosphor for an image) or a digital system (i.e., a system where a user views a digital output from a camera focused on a phosphor screen). In particular, the gain layer 120, which may be formed from or on a wafer or substrate 202 (e.g., a silicon substrate), defines an active area 204 that is configured to receive and amplify electrons emitted by the cathode layer 130. The active area 204 includes a lattice of interior walls or ribs 210 and a series of textured surfaces 230 formed therebetween. That is, the ribs 210 form a plurality of pixels 212 and the textured surfaces 230 are formed within the pixels 212.

The ribs 210 are made of p-type doping (i.e., formed from a doped material) and extend, at least slightly, above the input surface 122 of the gain layer 120 (which may also be referred to as the input surface 122 of the gain layer substrate 202). The ribs 210 also extend, at least partially through the substrate 202, in a direction that is perpendicular to the input surface 122 (as well as the output surface 124), at least in its initial state (i.e., prior to forming the textured surfaces). That is, the ribs 210 may extend orthogonally through at least a portion of the gain layer substrate 202 from the input surface 122 to or towards the emission surface 124 (which is illustrated as a vertical direction in FIG. 2). As explained in further detail below in connection with FIG. 5, the ribs 210 can be formed in the wafer 202 with dopant selective etching techniques, implanting techniques, or any other techniques that define a lattice of doped walls or ribs 210 within and above (at least slightly) the gain layer substrate 202.

Notably, since the ribs are made of a doped material, the ribs 120 prevent, or at least discourage, electrons from moving laterally within the gain layer substrate 202 (since the doping produces an electrostatic barrier (i.e., the doping produces an electric field that repels negative charged carriers) and has a lower lifetime, it limits signal transfer). Moreover, since the ribs 120 are doped, the textured surfaces 230 may be self-aligned on the substrate 202. For example, if the textured surfaces 230 are formed with wet/anisotropic etching techniques, the gain layer 120 can be etched after the ribs 210 are formed in the substrate 202 and the ribs 210 will act as a mask to ensure the etchant only etches in the pixels 212 between the ribs 210. Regardless of how the textured surfaces 230 are formed, the textured surfaces 230, in at least some embodiments, may be depressions that are shaped as inverted pyramids, as is described in further detail below.

Figure 2:
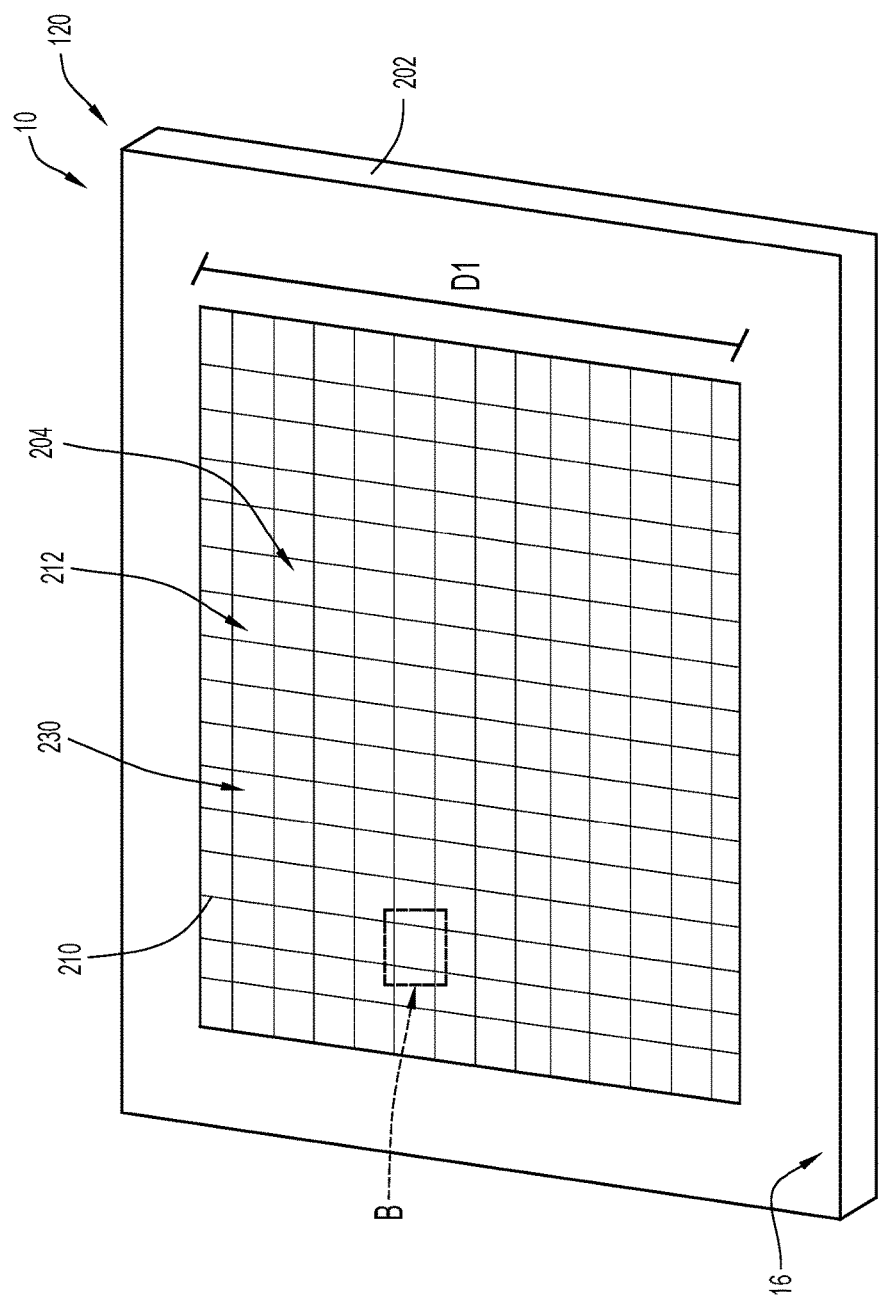
FIG. 2 illustrates a perspective view of the electron multiplier included in the MEMS image intensifier of FIG. 1.

FIG. 2 illustrates a perspective view of a die 10 including the electron multiplier 120 included in the MEMS image intensifier 100 of FIG. 1. As mentioned, the electron multiplier 120 includes a plurality of pixels 212 that are formed, by a plurality of ribs 210, in the active area 204 (also referred to as an imagining area 204) of the die 10. Each pixel 212 also includes a textured surface; however, for simplicity, the textured surfaces are not shown in FIG. 2. Instead, FIG. 2 provides an overall perspective of a die. Consequently, in FIG. 2, the entire active area 204 can be clearly seen to be a square with a length and width of dimension D1. More specifically, in the depicted example, the active area 204 is a square area that is approximately 14 millimeters (mm) by 14 mm (i.e., D1 is 14 mm). However, in other embodiments, the active area 204 may be any shape and size. Moreover, regardless of the shape and size of the active area 204, the active area 204 is bounded by an external band 16 that allows the die 10 to be secured and sealed to additional components (i.e., to additional the cathode 130 and/or phosphor screen 140 with a vacuum seal). In the depicted embodiment, the external band 16 is formed from the gain layer substrate 202 (e.g., a silicon substrate).

Still referring to FIG. 2, in the depicted embodiment, the pixels 212 are uniform pixels. That is, the pixels 212 are patterned in a regular, repeating pattern, insofar as the pixels 212 each have the same dimensions and are separated by the same distance. For example, each pixel 212 may be a square with length and width dimensions (depicted as W1 in FIG. 4) in the range of approximately 4 microns to approximately 6 microns. Meanwhile, each rib 210 may have a thickness (depicted as W2 in FIG. 4) of approximately 0.3 microns so that adjacent pixels 212 are separated by a distance of approximately 0.3 microns. With these dimensions, the electron multiplier 120 may have an open area ratio of approximately 88%. That is, the pixels 212 may cover approximately 88% of the electron multiplier's normal surface area (the surface area seen from a normal position relative to the electron multiplier 120 (the top of the page in the Figures)).

However, in other embodiments, the open area ratio may be in the range of approximately 80% to 95%. Generally, higher open area ratios may serve to more effectively reduce the halo effect created by backscattered electrons (since higher open area ratios reduce the chance of an electron impacting a top surface 214 (see FIG. 4) of a rib 210), but the open area ratio must also be balanced against the structural integrity of the lattice of interior ribs 210 and the size of the pixels 212. Notably, thinner ribs 210 may be more unstable and larger pixels 212 may be less effective in preventing backscattered electrons from re-impacting the gain layer 120. As is explained in further detail below, the textured surfaces 230 substantially span each of the pixels 212 and, thus, the textured surfaces 230 collectively cover a portion of the active area 204 equivalent to the open area ratio (i.e., 80-95%) regardless of the particular ratio created by different configurations.

Figure 3:
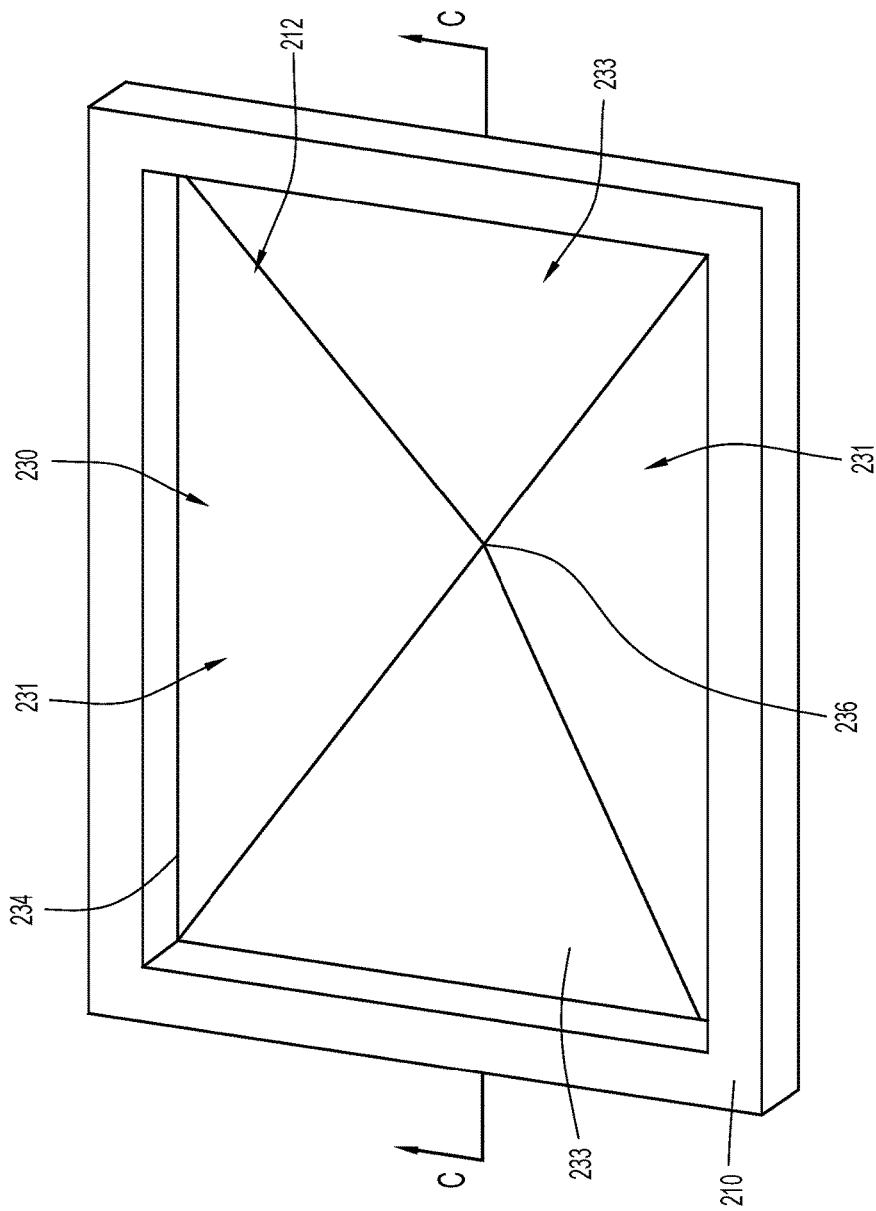
FIG. 3 illustrates a perspective view of inset B from FIG. 2.

FIG. 3 depicts in perspective the single pixel 212 from inset B of FIG. 2, but illustrates this pixel with its textured surface 230. As can be seen, in the depicted embodiment, the textured surface 230 is an inverted pyramidal depression. The pyramid includes two sets of opposing faces: set 231 and set 233. At a top 234 of the depression 230, the opposing sets of faces 231 and 233 form a square that spans the entire (or nearly the entire) pixel 212. That is, at the top 234, the opposing sets of faces 231 and 233 may span the four ribs 210 forming a boundary around the pixel 212. Meanwhile, the four faces included in the two opposing sets of faces 231 and 233 converge at a bottom 236 of the depression 230 so that the bottom 236 is essentially a point.

As is explained in further detail below in connection with FIG. 5, in the depicted embodiment, the depression 230 is formed via etching. Consequently, the depression 230 is etched along crystallographic planes and is shaped as a square pyramid. More specifically, anisotropic wet etching techniques may be utilized to etch the inverted pyramid into a Silicon wafer and, thus, the sides (e.g., the faces in sets 231 and 233) are {111} planes the form an interior angle between the pyramidal wall and the input surface 122 that measures 54.7° (this angle may be referred to herein as the wall angle).

That being said, in different embodiments, the depression the depression may take any desirable shape and may be created in any desirable manner. For example, bottom 236 of the depression 230 may be a flat surface that is substantially smaller than the opening defined at the top 234 of the depression 230. In other words, in the depicted embodiment the depression is a complete inverted pyramid, but in other embodiments, the depression 230 may be a truncated pyramid. In still other embodiments, the depression 230 may be a conical pyramid or any other desirable shape (e.g., to match a shape of a pixel 212 or by somehow etching along another plane). However, depressions 230 without any surfaces that are parallel to the input surface 122 (e.g., complete pyramids) may be preferred since these shapes may discourage electrons from bouncing away from the gain layer 120 (flat surfaces that are parallel to the input surface 122 may allow an electron to bounce straight away, which may allow the electron to then accelerate into another pixel). Moreover, regardless of its shape, the depression 230 extends only partially through the substrate 202 so that holes are not formed in the gain layer 120 (which might destroy the vacuum during some of the processing steps). Notably, if the electrons from the cathode do not have a surface to land on, the electrons from the cathode cannot create gain.

Figure 4:
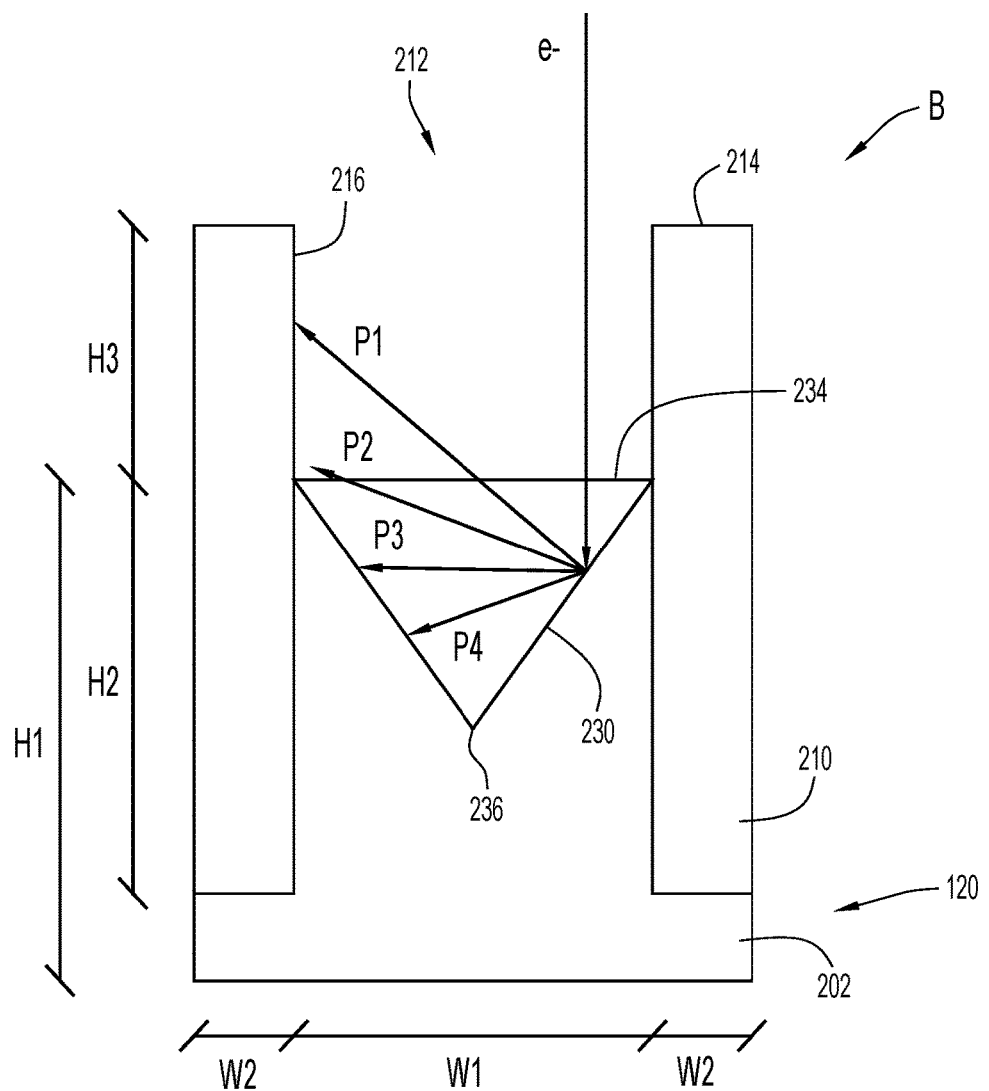
FIG. 4 illustrates a sectional view taken along line C-C from FIG. 3. This sectional view is also a close-up view of inset A from the sectional view of FIG. 1.

Still referring to FIG. 3, but now with reference to FIG. 4 as well (which illustrates sectional view of a pixel taken along line C-C from FIG. 3 that is also a close-up view of inset A from FIG. 1), in the depicted embodiment, the depth of the depression 230 is directly linked to the width W1 of the pixel 212, as governed by Pythagorean principles. In particular, the depth of a depression 230 may be determined by the following equation: ($\frac{1}{2}$(pixel width W1) * tan(wall angle)). Thus, if anisotropic wet etching techniques are utilized to etch the inverted pyramid into a silicon wafer (and, thus, the wall angle is)54.7°, the depression depth may be approximately $\frac{7}{10}$the size of the pixel width (i.e.,) tan (54.7° *0.5=approximately 0.7). As a specific example, if the pixel width is in the range of 4 to 6 microns (which is mentioned above as an example range), the depression depth may be in the range of approximately 2.8 microns to approximately 4.2 microns. These formulas may hold true even if the etching somehow acts along a different plane, but will not hold true if the etching somehow creates curvature in the depression walls.

By comparison, and now referring to FIG. 4, the height of the ribs 230 may be loosely tied to the size of the pixels 212, but may not be directly determinable based on the pixel size. Instead, the overall height of the ribs 212 may be the sum of a substrate height H2 and an extension height H3 (i.e., H2+H3=the overall height of the ribs 210), each of which may be determined based on distinct factors. First, the substrate height H2 of the ribs 210 is a non-zero height that ensures that the ribs extend at least partially through the substrate 202 (i.e.,0<H2≤H1). However, at the same time, the ribs 210 may be more effective at limiting crosstalk between pixels as H2 converges on H1. That is, ribs 210 that extend further through the substrate 202 may be more effective at eliminating crosstalk between pixels 212. Consequently, in at least some embodiments, the substrate height H2 may be based on the height H1 of the substrate. In fact, in some embodiments, the ribs may extend entirely through the substrate 202 (and, thus, H2=H1). Alternatively, the ribs 210 may have a substrate height H2 that is a fraction of the height H1 of the substrate. For example, the ribs 210 may extend halfway or three-quarters of the way through the substrate (i.e., H2=0.5*H1 or 0.75*H1). However, generally, the substrate height H2 may depend on the technique used to create the ribs 210 within the substrate 202. For example, implantation may limit the height H2 as compared to dopant selective etching techniques.

Second, the extension height H3 may be the height that the ribs 210 extend above a pre-textured input surface 122 (which may be aligned with a top 234 of the depressions 230). The extension height H3 may vary from embodiment to embodiment and may be determined by balancing the need to prevent halo effect against the need to prevent loss of electrons. Notably, if the ribs include a height H3 that is relatively taller (i.e., as the ribs extend further above the input surface 122), the ribs 120 may eliminate more halo effect by preventing backscattered electrons from re-impacting different pixels 212. However, as the ribs 120 extend further above the input surface 122 (i.e., as H3 increases), the ribs 120 may cause an increase electron loss at least because the ribs 120 may include more exposed surface area which an electron may impact (and the dopant materials forming the ribs 120 does not provide signal, so electrons impacting exposed portions of the ribs 120 may be lost).

In at least some embodiments, the rib height H3 may be determined based on pixel pitch (which may be determined based on the size of the pixels 212 and the width of the ribs 210). For example, the rib height H3 may be less than approximately two-and-one-half times greater than the pixel pitch of the depressions 230 (i.e., H3<2.5*pixel pitch). Notably, backscatter may begin to asymptote just after the wall height approaches a dimension that is 2.5 times greater than the pixel pitch and, thus, increasing the wall height H3 past this dimension (i.e., 2.5*pixel pitch) may not be worthwhile (at least in view of the desire to minimize electron loss). As an example, when the pixels 212 are squares with length and width dimensions in the range of approximately 4 to approximately 6 microns, the ribs 210 may have a height H3 that is less than approximately 10 to approximately 15 microns (as determined by multiplying the specific length/width dimension by 2.5). As a more specific example, the ribs 210 may extend approximately 5 to approximately 10 microns above the input surface (i.e., H3=5-10 microns) when the pixels 212 are squares with length and width dimensions in the range of approximately 4 to approximately 6 microns. At this height, the ribs 120 may reduce the halo effect without providing a substantial increase in lost electrons.

To demonstrate the interplay between the extension height H3, halo effect, and electron loss, FIG. 4 illustrates multiple possible paths (P1-P4) along which a backscattered electron may travel. Notably, if a backscattered electron impacts the substrate 202, the electron may be captured and amplified in its proper pixel 212. If, instead, a backscattered electron impacts the doped walls 230 (or more specifically, the backscatter electron impacts an interior surface 216 of the doped walls 230), the electron may be lost. Still further, if a backscattered electron travels into another pixel 212 (i.e., a backscattered electron travels above the top surface 214 of the doped walls 230 and into another pixel 212), the backscattered electron may generate a halo effect. Thus, in FIG. 4, if the electron travels along path P3 or P4, the electron may be captured and amplified. Alternatively, if the electron travels along path P2 or P1, the electron may not generate halo effect, but it may be lost. Thus, the doped walls 230 should have an extension height H3 that is high enough to prevent electrons from moving between pixels 212; however, at the same time, the extension height H3 should be minimized to minimize electron loss. Moreover, the height of the extension H3 must be determined in view of the geometry of the textured surface 230.

Regardless of the specific height H3 of the ribs 210, the ribs 230 (or at least the portion of the ribs 230 denoted by height H3, which may be referred to as the rib extension) and the textured surfaces 230 collectively act to substantially reduce electron scatter (and the halo effect associated therewith). In particular, the lattice of ribs 210 prevents backscattered electrons from traveling laterally into another pixel 212 and the textured surfaces encourage backscattered electrons to bounce into the substrate or, if not, into the ribs 210. That is, the textured surfaces 230 encourage backscattering electrons to travel along path P1 or P2 or, alternatively, along path P3 or P4. Put another way, the textured surfaces 230 encourage backscattering electrons to bounce from one face in one of the sets of faces 231, 233 towards the other face in the same set 231, 233 which, in turn, directs the backscattering electrons towards the substrate 202 or the ribs 210 bounding a pixel 212. If instead, a pixel 212 included only the ribs 210, a backscattering electron might bounce away from the gain layer in a direction normal to the input surface and escape the pixel 212. On the other hand, if a pixel 212 included only the textured surfaces 230, electrons bouncing along paths P3 or P4 would escape the pixel and degrade performance of the electron multiplier.

Figure 5:
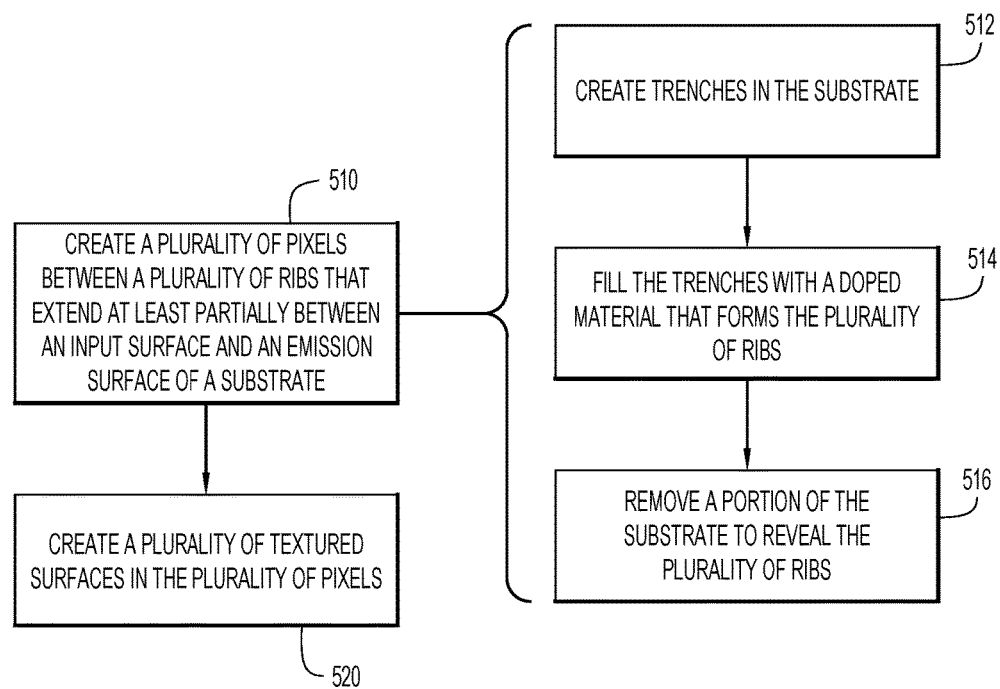
FIG. 5 illustrates a high-level flow chart of a method for forming an electron multiplier for a MEMS image intensifier, according to an example embodiment of the present invention.

FIG. 5 illustrates a high-level flow chart of a method for forming an electron multiplier for a MEMS image intensifier, according to an example embodiment of the present invention. Initially, at step 510, a plurality of pixels is created. The plurality of pixels is created between a plurality of ribs that extend at least partially between an input surface and an emission surface of a substrate. In at least one embodiment, the creating of the pixels at 510 is a three-step process. First, at 512, trenches are created in the substrate. The trenches are formed from the input surface and/or the emission surface with any techniques suitable for removing material from a semiconductor substrate (i.e., a silicon substrate); however, preferably, the trenches have a high aspect ratio (i.e., the trenches are narrow and deep). Thin trenches maximize the open area ratio of the pixels (thereby allowing the textured surfaces to cover a large portion of the input surface) while deep trenches further reduce crosstalk between pixels. Then, at 514, the trenches are filled with a doped material that forms the plurality of ribs. The doped material may be deposited in the trenches via any deposition techniques now known or developed hereafter. Finally, at 516, a portion of the substrate is removed to reveal the plurality of ribs. For example, the substrate may be dry etched with dopant selective etching techniques to remove the substrate. This etching reveals the portion of the ribs denoted by height H3 in FIG. 4. However, steps 512, 514, and 516 are not the only manner of creating the pixels between the plurality of ribs. For example, in some embodiments, doped ribs may be deep implanted into the substrate as an alternative to steps 512, 514, and 516.

Once the plurality of pixels are created, a plurality of textured surfaces are created in the plurality of pixels at 520. For example, a substrate including the doped ribs may be wet etched to create the textured surfaces. The wet etching may utilize any type of silicon/bulk etchant, such as potassium hydroxide (KOH), tetra-methyl ammonium hydroxide (TMAH) and ethylene di-amine pyro-catechol (EDP). Regardless of the etchant, wet etching does not remove doped materials, so the ribs will not be removed. Instead, the ribs act as a mask so that the textured surfaces self-align (since the entire input surface can be wet etched and the textured surfaces automatically align within the pixels). Notably, with wet etching, the textured surfaces will initially be formed as truncated, inverted square pyramids. However, as the wet etching continues, the sides of the inverted pyramid will converge and the flat bottom of the truncated pyramid will disappear. As mentioned, the inverted pyramid may be most effective in reducing backscatter (since electrons cannot bounce off a surface that is parallel to the initial input surface of the substrate).

To summarize, in one form, an electron multiplier for a MEMS image intensifier is provided, comprising: an input surface for receiving electrons; an emission surface opposite the input surface; a plurality of doped ribs extending at least partially between the input surface and the emission surface to form a plurality of pixels; and a plurality of textured surfaces disposed in the plurality of pixels.

In another form, a method of forming an electron multiplier for a MEMS image intensifier is provided, comprising: creating a plurality of pixels between a plurality of ribs that extend at least partially between an input surface and an emission surface of a substrate; and creating a plurality of textured surfaces in the plurality of pixels.

In yet another form, an electron sensing device for a MEMS image intensifier is provided, comprising: a cathode for providing a source of electrons; and an anode for receiving electrons emitted from the cathode, the anode including a plurality of textured surfaces disposed between doped ribs that extend at least partially through the anode and define a plurality of pixels.

The electron multiplier, method of forming the electron multiplier, and the electron sensing device presented herein provides a number of advantages. Most notably, the embodiments presented herein reduce the halo effect caused by backscattered electrons and reduces crosstalk between pixels, while also limiting the number of electrons lost between the photocathode layer or component and the electron multiplier is desired. Halo effect is reduced by the lattice of ribs that form and bound each pixel. In particular, these ribs extend above textured surfaces formed in the pixels to prevent backscattered electrons from re-impacting the gain layer at a different pixel. The ribs, which are formed from a doped material, also extend, at least partially through the gain layer in order to prevent crosstalk between pixels in the gain layer. That is, the dopant provides lateral isolation within the gain layer. However, at the same time, the walls only extend slightly above the textured surfaces in order to minimize electron loss.

Moreover, the aforementioned features and advantages are created within the gain layer and do not require a separate layer (e.g., a separate layer of ribs) to be manufactured and bonded to the gain layer. Therefore, the techniques presented herein may be more inexpensive and less time consuming as compared to techniques that add a layer to a gain layer. In fact, the techniques herein produce a collimating structure, a doping profile, and a mask for etching of the pyramid structure (i.e., create self-aligned textured surfaces) by creating pixels defined by p-type doped ribs with a few (or a single) step process. Thus, the electron multiplier presented herein may be particularly inexpensive and efficient to manufacture, especially as compared to gain layers that include doped regions or textured regions that must be meticulously arranged on the gain layer. Consequently, the electron multiplier presented herein can be rapidly and efficiently produced at scale (i.e., via wafer scale processing).

At a higher level, since the electron multiplier presented herein reduces halo effect, crosstalk and electron loss, the electron multiplier presented herein improves image fidelity (i.e., as measured via the modulation transfer function). Thus, when the electron multiplier presented herein is incorporated into various imaging products, such as night vision goggles or scopes, the electron multiplier may provide a performance improvement by improving the image fidelity of the image produced, regardless of whether the night vision goggles are a digital or analog solution. Moreover, since the electron multiplier presented herein is suitable for wafer scale processing, the electron multiplier may be included in an electron sensing device/ image intensifier that provides a size and weight reduction as compared to other such components.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed:

1. An electron multiplier apparatus comprising:
   an input surface for receiving electrons;
   an emission surface opposite the input surface;
   a plurality of doped ribs extending at least partially between the input surface and the emission surface to form a plurality of pixels; and
   a plurality of textured surfaces disposed in the plurality of pixels.

2. The electron multiplier apparatus of claim 1, wherein the plurality of textured surfaces comprise a plurality of depressions.

3. The electron multiplier apparatus of claim 2, wherein each of the plurality of depressions is an inverted pyramid.

4. The electron multiplier apparatus of claim 3, wherein the inverted pyramid includes two sets of opposing faces and the two sets of opposing faces meet at a point at a bottom of the depression.

5. The electron multiplier apparatus of claim 1, wherein the plurality of doped ribs extend from the input surface to the emission surface.

6. The electron multiplier apparatus of claim 1, wherein the plurality of doped ribs extend above the input surface.

7. The electron multiplier apparatus of claim 1, wherein the plurality of pixels are square pixels and the plurality of textured surfaces include tops defined by the square pixels.

8. A method of forming an electron multiplier for a Micro-Electro-Mechanical-Systems (MEMS) image intensifier, comprising:
   creating a plurality of pixels between a plurality of ribs that extend at least partially between an input surface and an emission surface of a substrate; and
   creating a plurality of textured surfaces in the plurality of pixels.

9. The method of claim 8, wherein the creating of the plurality of pixels comprises:
   creating trenches in the substrate;
   filling the trenches with a doped material that forms the plurality of ribs; and
   removing a portion of the substrate to reveal the plurality of ribs.

10. The method of claim 9, wherein the removing comprises:
    dry etching the substrate.

11. The method of claim 9, wherein the trenches comprise a lattice of trenches and the plurality of pixels are square pixels.

12. The method of claim 8, wherein the creating of the plurality of pixels comprises:
    implanting the plurality of ribs into the substrate.

13. The method of claim 8, wherein the creating the plurality of textured surfaces comprises:
   wet etching the substrate between the plurality of ribs to form the textured surfaces in the pixels.

14. The method of claim 13, wherein the plurality of ribs are formed from a doped material and act as a mask during the wet etching.

15. The method of claim 8, wherein the plurality of textured surfaces are inverted pyramids.

16. An electron sensing device comprising:
   a cathode for providing a source of electrons; and
   an anode for receiving electrons emitted from the cathode, the anode including a plurality of textured surfaces disposed between doped ribs that extend at least partially through the anode and define a plurality of pixels.

17. The electron sensing device of claim 16, wherein the plurality of textured surfaces comprise a plurality of inverted pyramid depressions.

18. The electron sensing device of claim 16, wherein the doped ribs extend above a top surface of the anode and below a bottom of the textured surfaces.

19. The electron sensing device of claim 18, wherein the doped ribs are perpendicular to the top surface of the anode.

20. The electron sensing device of claim 16, wherein the anode receives a first number of electrons and outputs a second number of electrons, the second number being larger than the first number.

\* \* \* \* \*